US008335980B2

(12) United States Patent
Cantegrel

(10) Patent No.: US 8,335,980 B2
(45) Date of Patent: Dec. 18, 2012

(54) DEVICE AND METHOD FOR MANAGING ELECTRONIC BOOKMARKS, CORRESPONDING STORAGE MEANS

(75) Inventor: Thibault Cantegrel, Corronsac (FR)

(73) Assignee: Sierra Wireless Solutions and Services, Labege (FR)

( * ) Notice: Subject to any disclaimer, the term of this patent is extended or adjusted under 35 U.S.C. 154(b) by 406 days.

(21) Appl. No.: 12/626,762

(22) Filed: Nov. 27, 2009

(65) Prior Publication Data

US 2010/0138731 A1 Jun. 3, 2010

(30) Foreign Application Priority Data

Nov. 28, 2008 (FR) ...................................... 08 58119

(51) Int. Cl.
*G06F 17/30* (2006.01)
(52) U.S. Cl. ..................... 715/208; 715/205; 715/206
(58) Field of Classification Search .................. 715/200, 715/205, 206, 208, 255, 273
See application file for complete search history.

(56) References Cited

U.S. PATENT DOCUMENTS

| | | | |
|---|---|---|---|
| 6,393,462 B1 | 5/2002 | Mullen-Schultz | |
| 7,324,997 B2* | 1/2008 | Yamada | 1/1 |
| 7,570,943 B2* | 8/2009 | Sorvari et al. | 455/414.1 |
| 7,702,675 B1* | 4/2010 | Khosla et al. | 707/710 |
| 7,839,522 B2* | 11/2010 | Ohara et al. | 358/1.15 |
| 8,051,081 B2* | 11/2011 | Shahraray et al. | 707/736 |
| 2004/0043758 A1* | 3/2004 | Sorvari et al. | 455/414.1 |
| 2007/0033516 A1* | 2/2007 | Khosla et al. | 715/501.1 |
| 2007/0033517 A1* | 2/2007 | O'Shaughnessy et al. | 715/501.1 |
| 2007/0165554 A1* | 7/2007 | Jefferson et al. | 370/315 |
| 2009/0164564 A1* | 6/2009 | Willis | 709/203 |
| 2010/0042642 A1* | 2/2010 | Shahraray et al. | 707/102 |
| 2010/0088726 A1* | 4/2010 | Curtis et al. | 725/45 |
| 2010/0115596 A1* | 5/2010 | Horozov et al. | 726/7 |

FOREIGN PATENT DOCUMENTS

WO 2008087552 A2 7/2008

OTHER PUBLICATIONS

French Search Report of Counterpart Application No. 08/58119; filed on Nov. 28, 2008.

* cited by examiner

*Primary Examiner* — Stephen Hong
*Assistant Examiner* — Gregory J Vaughn
(74) *Attorney, Agent, or Firm* — David D. Brush; Westman, Champlin & Kelly, P.A.

(57) ABSTRACT

A device for managing electronic bookmarks. The device includes an element implementing a main function of managing electronic bookmarks, activated at start-up and at determined instants, except when the device switches to a stand-by mode. The element implementing the main function includes: a transmitter, allowing transmission to a server a request to obtain a preconfigured list of bookmarks, wherein the request includes a log-in of the device; a receiver, allowing the preconfigured list transmitted by the server in response to the request to be received; a display, allowing the preconfigured list to be displayed; and an element allowing a user to use the bookmarks of the preconfigured list displayed. The device does not include an element that helps in initial construction of the preconfigured list on the server nor an element that helps to add to the preconfigured list at least one additional bookmark not previously proposed by the server.

9 Claims, 4 Drawing Sheets

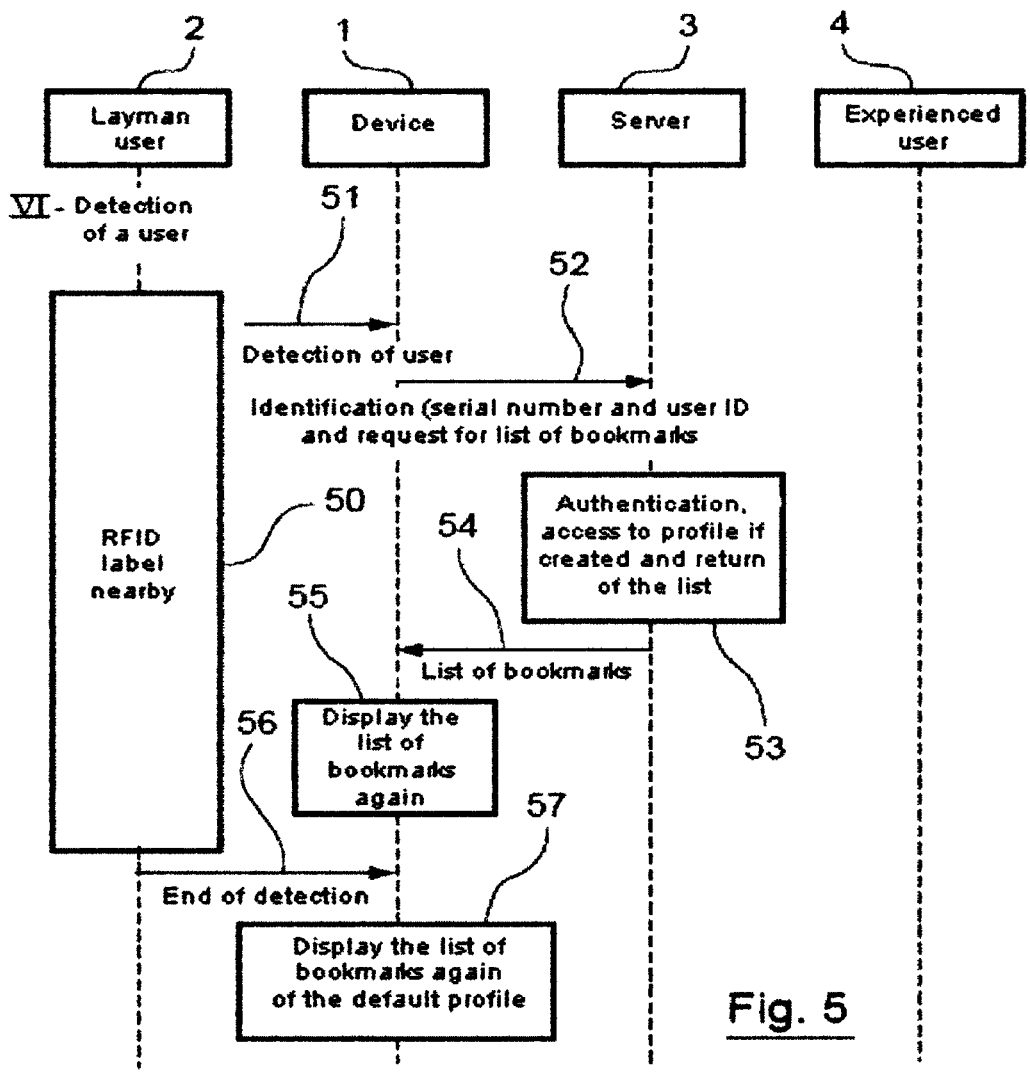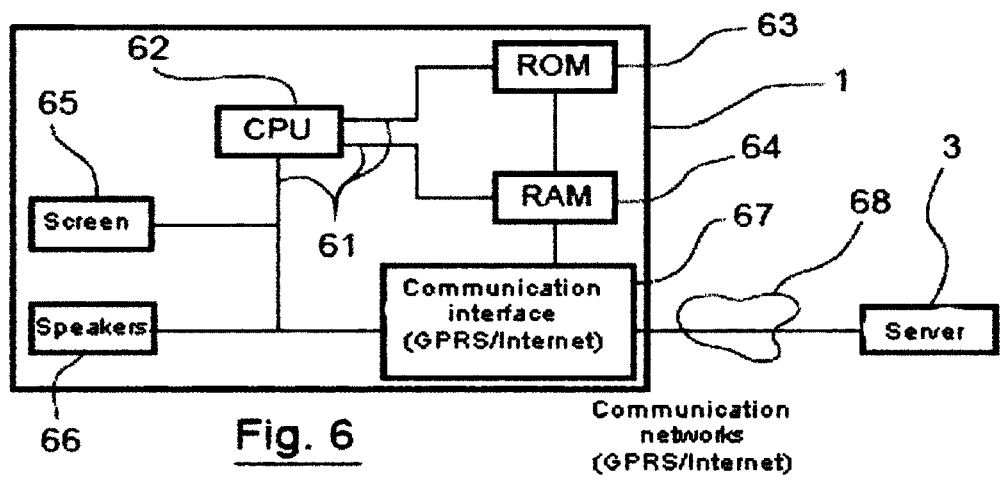

DEVICE AND METHOD FOR MANAGING ELECTRONIC BOOKMARKS, CORRESPONDING STORAGE MEANS

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the techniques of managing electronic bookmarks, also called "favorites" or even "shortcuts".

More precisely, an embodiment of the disclosure relates to an electronic device (and a method implemented by the latter) whose main function is the management of electronic bookmarks.

Usually, an electronic bookmark comprises a title, which identifies a web page for which the user wants to keep a trace, and an URL address ("Uniform Resource Locator") of this web page. Optionally, if the user provides this information, the bookmark may also comprise one or several key words and a description detailing this web page.

At the origin, it was proposed to integrate a tool for memorizing bookmarks into the web browser of a standard user communicating terminal, to allow the user to conserve, in the browser, a trace of the web pages that he/she wished to return to easily. With this first type of tool, hereunder called local tool, the management and the memorizing of the bookmarks are made within the browser.

By standard communicating terminal, it is meant a machine (desktop or laptop computer, PDA ("Personal Digital Assistant"), cellular telephone, etc. comprising an operating system on which a web browser is executed.

Subsequently, to facilitate the management of the bookmarks, a second type of tool for managing bookmarks on line was proposed, allowing the users, by means of the browser of their standard communicating terminal, to use a special website offering an on line service allowing them to save and even share bookmarks in this special website.

By way of example of this second type of tool, the website "del.icio.us" was developed in a community aim to compensate the weaknesses of traditional bookmark management tools (integrated into the browsers). This site offers an on line bookmark management tool allowing each user, who accesses using the browser of his/her standard communicating terminal, to organize and memorize his/her bookmarks on the "del.icio.us" website (instead of in his/her browser). This permits the user to have access to his/her own list of bookmarks from any standard communicating terminal connected to Internet, and also to the lists of bookmarks compiled by other internet users (and consequently benefit from the memorizing of the bookmarks made by these other internet users).

BACKGROUND OF THE DISCLOSURE

One disadvantage of the current techniques, both when the bookmark management tool is local (which is to say integrated into the browser) and when it is on line (which is to say remote in a special website), is that they are not easy to use for novice users.

Indeed, in the case of a local bookmark management tool, the user needs to know how to use a standard communicating terminal (computer, PDA, cellular telephone . . . ), and more precisely needs to know how:

To interact with the operating system of the standard communicating terminal to execute the browser (from several applications supported by the operating system); then To use, from the functions of the web browser, the bookmark management tool to compile and view his/her list of bookmarks.

In the case of an on line bookmark management tool, it is even more complex as the user needs to know how:

To interact with the operating system of the standard communicating terminal to execute the browser (from several applications supported by the operating system); then To use the web browser:
to access a special website offering an on-line bookmark management tool (for example "del.icio.us"), which implies that the user knows the URL address of this website, and entering a log-in and a password;
to use the functions of the bookmark management tool to compile and view his/her list of bookmarks.

However there are many novices today who do not know how to, or do not wish to, carry out the above operations on a standard communicating terminal. In practice, these novices do not use all of the advantages associated with electronic bookmarks and therefore do not easily access web pages which could in fact be of real interest to them. There is however a need for these novices to be able to view easily a list of bookmarks, and use the bookmarks of this list (which is to say to access the web pages contained in the bookmarks).

Moreover, for these novices as for experienced users, it is difficult to imagine using a standard communicating terminal, only dedicated to performing this function of viewing and using a list of bookmarks. Indeed, a standard communicating terminal (computer, PDA, cellular telephone . . . ) is not adapted as it is generally costly, cumbersome and consumes energy, due to the fact that is designed to execute many applications offering many functions.

Another disadvantage of the current techniques of managing bookmarks is that they do not allow the user to view, at the same time as a list of bookmarks:
information on the state of the elements memorized by the bookmarks;
the commands which may be executed by the elements memorized by the bookmarks; or
events related to the elements memorized by the bookmarks.

Yet another disadvantage of the current techniques of managing bookmarks is that they only propose to manage two types of bookmarks: those which memorize contents (for example, audio, video or text contents) or services (for example, weather forecast service). There is a need to be able to manage other types of bookmarks, memorizing people (for example, a circle of friends) or connected objects (for example, sensors or actuators).

Yet another disadvantage of the current techniques of managing bookmarks is that they do not propose a simple solution so that the list of bookmarks displayed on a screen is adapted to the user located close to this screen.

SUMMARY

One specific aspect of the disclosure proposes a device for managing electronic bookmarks, comprising means of implementing a main function for managing electronic bookmarks, activated at start-up and at determined instants, except when said device for managing bookmarks switches to a stand-by mode, wherein said means of implementing the main function comprise:

- first transmission means, allowing a request to obtain a preconfigured list of bookmarks to be transmitted to a server, wherein said request comprises a log-in for said device for managing bookmarks;
- first reception means, allowing said preconfigured list transmitted by said server in response to said request to be received;
- display means, allowing the preconfigured list received to be displayed;
- means of use, allowing a user to use the bookmarks of the preconfigured list displayed;
- second reception means, allowing a proposal to be received, sent by the server, to add at least one additional bookmark to said preconfigured list;
- means of accepting or refusing, allowing said user to accept or refuse the proposal received;
- second transmission means, allowing the acceptance or the refusal formulated by the user to be transmitted to the server, so that the server adds said at least one additional bookmark to said preconfigured list if accepted.

Said device for managing bookmarks does not comprise means which help in the initial construction of said preconfigured list on said server, nor means which help to add to said preconfigured list at least one additional bookmark not previously already by said server.

The general principle of the disclosure thus includes displaying a list of bookmarks by means of a specific electronic device, for which this is the main function. An embodiment of the disclosure is therefore based on a completely new and inventive approach consisting of providing a device dedicated to viewing and using a preconfigured list of bookmarks, but which does not allow the initial construction of this preconfigured list. This initial construction may be carried out either by default (for example by the server manager) or by an experienced user (who uses a standard communicating terminal for this purpose).

Consequently, the specific device of an embodiment of the disclosure is cheap, compact and does not consume much energy. Indeed, contrary to a standard communicating terminal as mentioned above (computer, PDA, cellular telephone ...), it does not require an operating system for the terminal executing a standard web browser.

Moreover, it may be used by a novice as the interface of the device is not that of a standard web browser as it is impossible to access anything else than what is already preconfigured. Consequently, its use is extremely simplified.

Of course, the specific device of an embodiment of the disclosure is also of interest for an experienced user, as the latter may use:
- a standard communicating terminal (for example a desktop computer in the home) for the initial construction of the preconfigured list of bookmarks (or to add later bookmarks not already proposed by the server), and
- the specific device of an embodiment of the disclosure (for example in the form of a frame on a piece of furniture or onto the door of the refrigerator) to view and use the preconfigured list of bookmarks.

Consequently, the user may easily complete the preconfigured list of bookmarks, but only within the limit of what the server proposes. This is therefore clearly different from the known techniques mentioned above which offer complete liberty to the user to construct his/her list, but as explained above, this implies that the user is experienced and has a standard communicating terminal.

Advantageously, said means of implementing the main function comprise:
- first selection means, allowing said user to select at least one bookmark to be deleted from said preconfigured list;
- third transmission means, allowing a request to delete said at least one bookmark to be deleted to be transmitted to the server, so that the server deletes said at least one bookmark to be deleted from said preconfigured list.

Consequently, the user may easily delete a bookmark from the preconfigured list of bookmarks.

According to one advantageous feature, each bookmark of said preconfigured list comprises a log-in for an element memorized by said bookmark, and a link to said element memorized by said bookmark. The elements memorized by the bookmarks of said preconfigured list belong to the group comprising connected objects, services, people and contents.

Consequently, the specific device of an embodiment of the disclosure permits a greater number of types of bookmarks to be managed.

By link, it is especially but not exclusively meant a URL address. For example:
- for a bookmark whose memorized element is a content or a service, the link to this element is its URL address on the internet network;
- for a bookmark whose memorized element is a connected object, the link to this element is its URN address ("Uniform Resource Name"), which identifies it uniquely especially in the server; and
- for a bookmark whose memorized element is a person, the link to this person is a log-in, which identifies them uniquely especially in the server.

Advantageously, each bookmark of said preconfigured list comprises un log-in d'un element memorized by said bookmark, and a link to said element memorized by said bookmark. Said means of use comprise thirds reception means, allowing at least one event to be received, sent by the server, related to an element memorized by one of the bookmarks of said preconfigured list. Said display means allow said at least one event received to be displayed.

Consequently, the specific device of the disclosure permits a list of bookmarks enriched with events related to the elements memorized by the bookmarks to be viewed.

Advantageously, each bookmark of said preconfigured list comprises a log-in for an element memorized by said bookmark, and a link to said element memorized by said bookmark. At least one bookmark of said preconfigured list is associated to at least one item of information, that may or may not be dynamic, on the state of the element memorized by said bookmark. Said display means allow said at least one item if information to be displayed.

Consequently, the specific device of an embodiment of the disclosure permits a list of bookmarks enriched with information on the state des elements memorized by the bookmarks to be viewed.

Advantageously, each bookmark of said preconfigured list comprises a log-in for an element memorized by said bookmark, and a link to said element memorized by said bookmark. At least one bookmark of said preconfigured list is associated to at least one command that may be executed by the element memorized by said bookmark. Said display means allow said at least one command to be displayed.

Consequently, the specific device of an embodiment of the disclosure permits a list of bookmarks enriched with commands to be viewed, which the user may activate.

Advantageously, said device comprises wireless communication means with said server.

Consequently, the specific device of an embodiment of the disclosure may be used anywhere.

According to one advantageous feature, said device comprises:

detection means, allowing a user to be detected and to obtain a log-in for the user detected;
 insertion means, activated if a user is detected and which allow the log-in of the user detected to be inserted into said request to obtain the preconfigured list of bookmarks;
 such that said preconfigured list, transmitted by said server in response to said request, is in function of the log-in of the user detected.

Consequently, the specific device of an embodiment of the disclosure displays a list of bookmarks that depends on the user detected. In the case where no user is detected, the list displayed depends on the device itself, whose log-in is provided in the request sent to the server to obtain the list.

In another embodiment, the disclosure relates to a method for managing electronic bookmarks, executed by a device for managing electronic bookmarks. This method comprises steps to perform a main function for managing electronic bookmarks, carried out at the start-up of said device and at determined instants, except when said device is switched to a stand-by mode, wherein said steps to perform the main function comprise steps consisting of:

transmitting to a server a request to obtain a preconfigured list of bookmarks, wherein said request comprises a log-in of said device for managing bookmarks;
 receiving said preconfigured list transmitted by said server in response to said request;
 displaying the preconfigured list received;
 allowing a user to use the bookmarks of the preconfigured list displayed;
 receiving a proposal, sent by the server, to add at least one additional bookmark to said preconfigured list;
 allowing a user to accept or refuse the proposal received;
 transmitting to the server the acceptance or the refusal (44) made by the user, so that the server adds said at least one additional bookmark to said preconfigured list in the case of acceptance.

This method does not comprise a step which helps in an initial construction of said preconfigured list on said server, nor a step which helps to add to said preconfigured list at least one additional bookmark not already proposed by said server.

More generally, in variants of embodiments, the method according to an embodiment of the disclosure comprises steps for the implementation of various means of the device for managing bookmarks according to an embodiment of the invention as previously described (in any of its different embodiments).

In another embodiment, the disclosure relates to a computer program that may be downloaded from a communication network and/or saved onto a support that may be read by a computer and/or executed by a processor. This computer program comprises program code instructions for the implementation of the method mentioned above (in any of its different embodiments), when said program is executed on a computer.

In another embodiment, the disclosure relates to storage means that may be read by a computer, that may be totally or partially removable, which store a computer program comprising a set of instructions that may be executed by a computer to implement the method described above (in any of its different embodiments).

BRIEF DESCRIPTION OF THE DRAWINGS

Other features and advantages of an embodiment of the disclosure will become clearer upon reading the following description, provided by way of example and in no way restrictively, and the appended drawings in which:

FIG. 5 presents a sequence diagram detailing the operation of the device for managing bookmarks of FIG. 1, in a user detection phase;

FIG. 6 presents the structure of a device according to a specific embodiment of the disclosure.

DETAILED DESCRIPTION OF ILLUSTRATIVE EMBODIMENTS

In all of the figures of this document, the identical elements and steps are designated by a same numerical reference.

Figure 1:
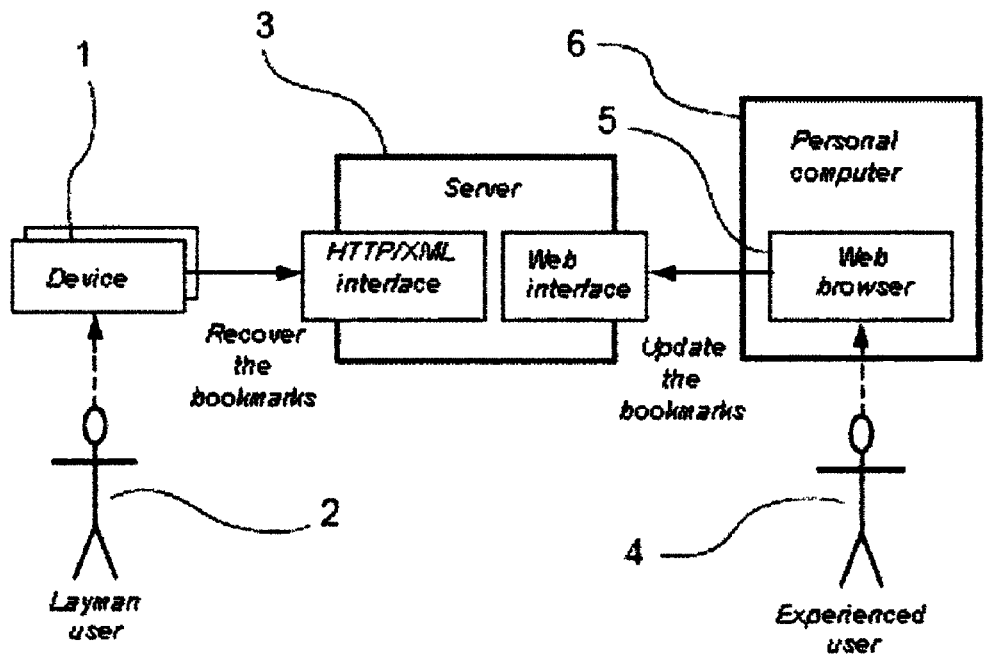
FIG. 1 illustrates the general operating principle of a device according to a specific embodiment of the disclosure.

Now, in relation to FIG. 1, the general operating principle of a device according to a specific embodiment of the disclosure will be presented.

An experienced user 4 uses a browser 5 of a personal computer 6 (or a mobile telephone) to access a server 3, via a web interface. In this way, the experienced user 4 may construct then update (adding, deleting or modifying) a list of bookmarks that is memorized by the server 3 (and called hereunder preconfigured list).

Furthermore, a layman user 2 uses a device for managing bookmarks 1 that is connected to the server 3, via a http/XML interface. To do so, he/she may use a wireless connection (for example of the GSM/GPRS type). This may be multi-protocol (example: Wifi/ADSL and GSM/GPRS).

The main function of the device 1 is the bookmark management. It allows the layman user 2 to view the preconfigured list of bookmarks, with no specific action required by the user. It also permits the layman user 2 to use easily the bookmarks of the preconfigured list. To do so, the device 1 comprises means for display and use which will be presented in detail below. These means comprise for example a touch-sensitive screen, and other means may of course be envisaged (voice command, detection of hand movements by a camera, etc.).

The exchanges between the server and the device are made for example as follows: the server (web application server) generates and transmits (using the HTTP protocol) to the device a web page containing a Javascript customer software program. This customer software program then allows the device to communicate (using the TCP/XML (AJAX) protocol) with the server, to update the list of bookmarks.

Contrary to the browser 5 of the personal computer 6, the device 1 does not comprise means which help in the initial construction of the preconfigured list memorized on the server 3, nor means which help to add to this preconfigured list an additional bookmark not already proposed by the server.

Now an example of the functions of a specific embodiment of device 1 will be presented, which allow the layman user 2 to use the list of bookmarks, as well as various enrichments of it (information, events and commands) which are detailed below.

Each bookmark comprises a log-in for an element memorized by this bookmark, and a link to this memorized element. The nature of the elements memorized by the bookmarks may be of four different types:
- Connected objects (examples: sensors, actuators);
- Services (example: weather forecasts);
- People (examples: family members or friends);
- Content (examples: music, video, text messages).

The device 1 allows events related to the elements memorized by the bookmarks of the list to be received, wherein these events are sent by the server 3. The display means, included in the device 1, allow the events received to be displayed. The server sends for example events with the updates of the list of bookmarks. The device displays for example the events for a certain period of time before returning, in the absence of action by the user, to the main function display of the list of bookmarks. A touch-sensitive screen allows for example the user to access the details of the events.

By way of illustration, here are a few examples of events:
- example of an event related to a connected object: the heating in the "Home" has switched to ECONOMY mode;
- example of an event related to a service: the weather forecast for tomorrow is "Sunny, 14° C. min., 25° C. max.";
- example of an event related to a person: Alix has sent you a voice message;
- example of an event related to a content: Jerome has left a comment on the song "X" by the singer "Y" in your audio library.

The device 1 also allows information, whether dynamic or not, to be displayed on the state of the elements memorized by the bookmarks of the list. In other terms, the bookmarks are dynamic: these items of information are displayed in addition to an identification of the element memorized by each bookmark (identification made for example by a text, image or any other means allowing the element to be logged in). For example, these items of information are numerical values, images, text values, etc. Actual examples of items of information are provided below in FIG. 2.

The device 1 permits commands to be displayed that may be executed by the elements memorized by the bookmarks, and permits the user to select and activate these commands.

By way of illustration, here are a few examples of commands:
- example of commands related to an audio content: read, pause, etc;
- example of commands related to connected objects: switch off the heating, deactivate the alarm, close the shutters;
- example of commands related to a person: leave a voice message, inform them that I am at home (for a child);
- example of commands related to a service: tick the list of shopping to be done (in a preconfigured list) (example: I need butter and milk).

The items of information and the commands may be displayed permanently or only if the user selects the associated bookmark (for example by pressing a button on a touch-sensitive screen). In this case, the selection of a bookmark provides a full screen display of the associated information and accessible commands (buttons that may be activated from the device). If there is no other action by the user and after a certain length of time, the screen will return to the display of the bookmarks (main function of the device).

Figure 2:
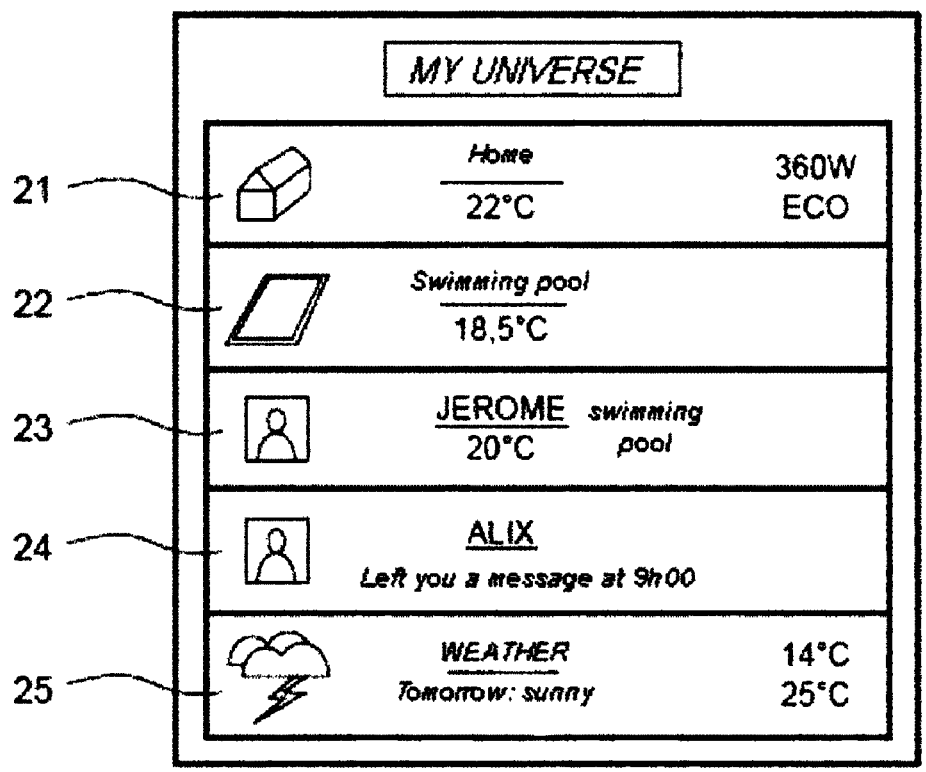
FIG. 2 presents an example of an enriched list of bookmarks displayed by the device for managing bookmarks of FIG. 1.

FIG. 2 presents an example of an enriched list of bookmarks displayed by the device for managing bookmarks 1 of FIG. 1.

This list, entitled "my universe", comprises five zones 21 to 25, each associated to a bookmark (whose title is shown underlined in FIG. 2).

In the first zone 21, a first bookmark is shown by its title "Home" and by an associated icon. The title of the bookmark is a log-in for the element memorized by the bookmark, which is to say in this case a set of connected objects representing the related home (category: connected object): a temperature sensor inside the home, an electricity and heating meter. In this first zone 21, items of information related to these connected objects are also provided: "22° C." (temperature measured), "260 W" (instantaneous electrical consumption) and "ECONOMY" (heating in Economy mode).

In the second zone 22, a second bookmark is shown by its title "Swimming pool" and by an associated icon. The title of the bookmark is a log-in for the element memorized by the bookmark, which is to say in this case a temperature sensor situated in a swimming pool (category: connected object). In this second zone 22, an item of information related to the sensor is also provided: "18.5° C." (temperature measured).

In the third zone 23, a third bookmark is shown by its title "Jerome" and by an associated icon. The title of the bookmark is a log-in for the element memorized by the bookmark, which is to say in this case a person. In this third zone 23, items of information are also provided ("swimming pool" and "18.5° C.") related to a connected object (temperature sensor in a swimming pool) of the profile of the person "Jerome".

In the fourth zone 24, a fourth bookmark is shown by its title "Alix" and by an associated icon. The title of the bookmark is a log-in for the element memorized by the bookmark, which is to say in this case a person. In this fourth zone 24, an item of information related to the state of the person "Alix" is provided: "offline".

In the fifth zone 25, a fifth bookmark is shown by its title "Weather" and by an associated icon. The title of the bookmark is a log-in for the element memorized by the bookmark, which is to say in this case a service. In this fifth zone 25, items of information related to the service are provided: "14° C." (today's temperature) and "Tomorrow: sunny 25° C." (forecast for the following day).

Figure 3:
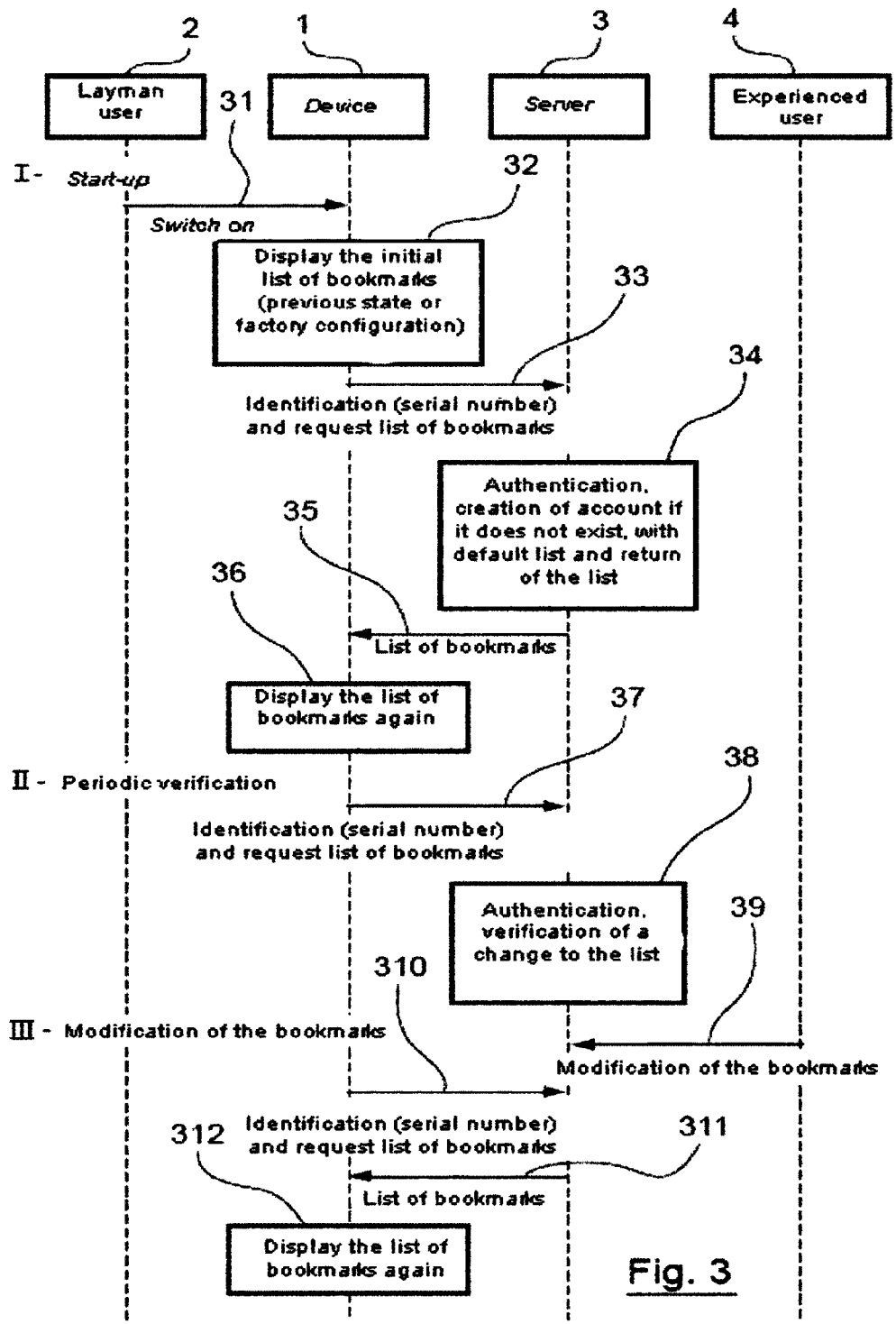
FIG. 3 presents a sequence diagram detailing the operation of the device for managing bookmarks of FIG. 1, in the start-up, periodic verification and modification phases.

Now in relation to FIG. 3, the operation of the device for managing bookmarks 1 will be presented, in the start-up (I), periodic verification (II) and modification (III) phases.

In the start-up phase (I), the layman user 2 switches on (arrow 31) the device 1. The device 1 then displays (block 32) the initial list of bookmarks (corresponding to the previous state of the list of bookmarks, if the device has already been used, or to a default list of bookmarks (factory configuration list)). Moreover, the device 1 transmits (arrow 33) to the server 3 a request to obtain a preconfigured list of bookmarks. This request comprises a log-in for the device 1 (serial number). Upon receipt of this request, the server 3 authenticates the device 1 and finds the account associated to the device 1 which comprises the list of bookmarks, if this account already exists, otherwise it creates a new account comprising a default list (block 34). Finally, the server 3 returns the list of bookmarks to the device 1 (block 35). Upon receipt of this list, the device 1 displays it and allows the user to use the bookmarks it contains (block 36).

In the periodic verification (II) phase, the device 1 again transmits (arrow 37) to the server 3 a request to obtain a preconfigured list of bookmarks. Upon receipt of this request, the server 3 authenticates the device 1 and finds the account associated to the device 1; then it verifies if the list of bookmarks in this account has been modified since the device 1 was last interrogated (block 38). If a modification has been made, see the description following the modification phase.

In the modification (III) phase, the experienced user 4 (by using the browser 5 of his/her personal computer 6, not shown in FIG. 3) accesses the server 3 to modify the list of bookmarks (adding, deleting or modifying bookmarks) and to obtain a modified list (arrow 39). The next time a request is received to obtain the list (arrow 310), sent by the device 1 (either during the next periodic verification, or after being advised of the modification of the list by the server), the server performs the actions of block 38 (again not shown, to simplify FIG. 3) then returns the modified list to the device 1 (arrow 311). Upon receipt of this modified list, the device 1 displays it and allows the user to use the bookmarks it contains (block 312).

Figure 4:
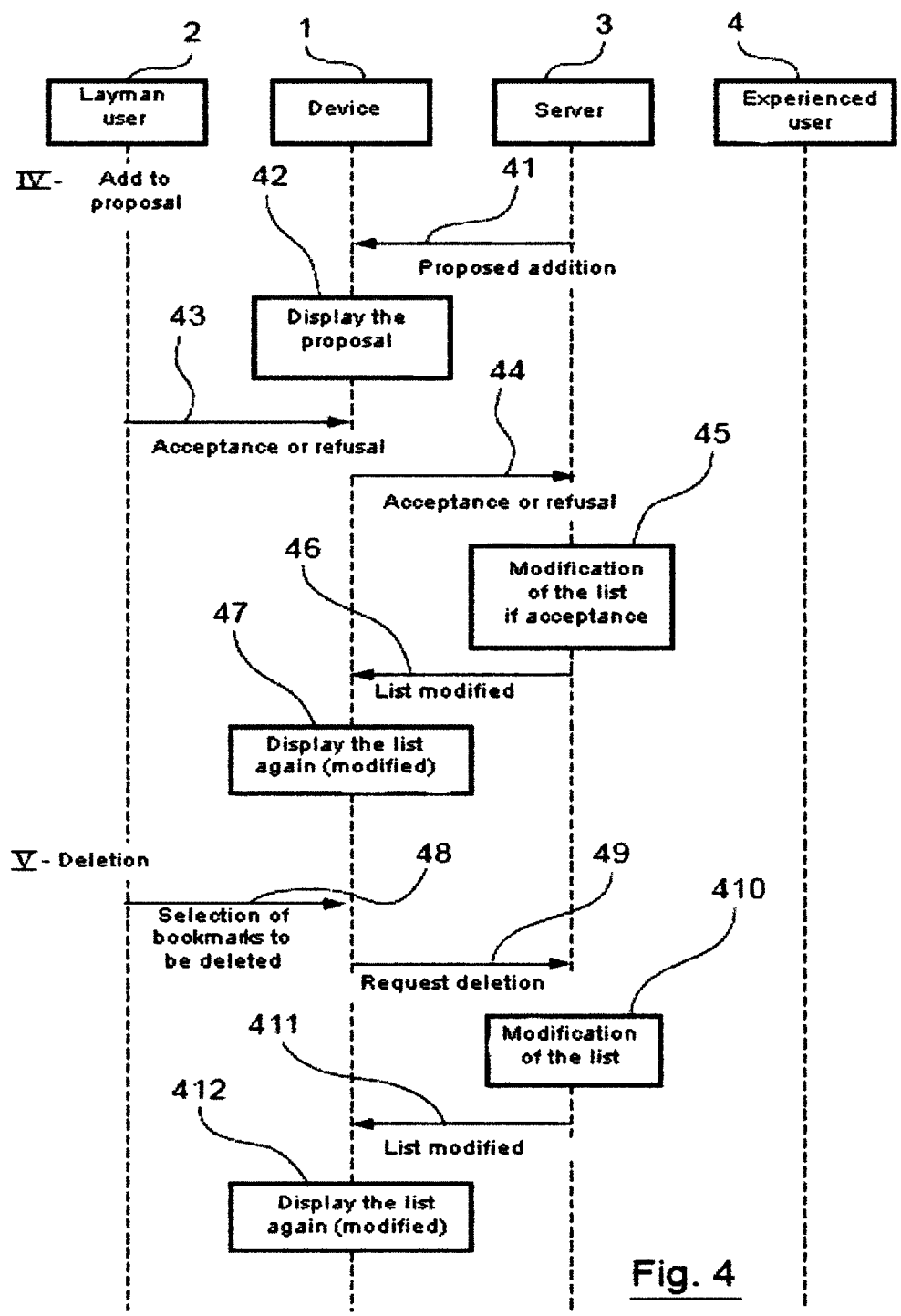
FIG. 4 presents a sequence diagram detailing the operation of the device for managing bookmarks of FIG. 1, in the adding and deleting of a bookmark phase.

Now in relation to FIG. 4, the operation of the device for managing bookmarks 1 will be presented, in the phases adding of bookmarks upon proposal (IV) and deleting of bookmarks (V).

In the phase for adding bookmarks upon proposal (IV), the server transmits to the device 1 (arrow 41) a proposal to add at least one additional bookmark to the list of bookmarks. Upon receipt of this proposal, the device 1 displays it and allows the layman user 2 to accept or refuse the proposal received (block 42). The layman user 2 makes his/her choice (arrow 43) and the device transmits the decision (acceptance or refusal) made by the layman user 2 to the server 3 (arrow 44). Finally, in the case of acceptance, the server 3 adds the at least one additional bookmark to the list (block 45) then returns the modified list to the device 1 (arrow 46). Upon receipt of this modified list, the device 1 displays it and allows the user to use the bookmarks that it contains (block 47). In the phase for deleting bookmarks (V), the layman user 2 selects at least one bookmark to be deleted from the list (arrow 48). The device transmits to the server 3 (arrow 49) the deletion request made by the layman user 2. The server 3 deletes the at least one bookmark from the list (block 410) then returns the modified list to the device 1 (arrow 411). Upon receipt of this list modified, the device 1 displays it and allows the user to use the bookmarks that it contains (block 412).

Now in relation to FIG. 5, the operation of the device for managing bookmarks 1 will be presented, in a user detection (VI) phase.

It is supposed in this case that the device 1 is not dedicated to a single user (contrary to a mobile telephone for example), but that it may be used by a set of users (for example in a public place, in a community or in a family). Each user is for example provided with a RFID label (block 50), containing a RFID code allowing the user to be detected and authenticated. Other detection and authentication techniques may be used without this leaving the scope of the disclosure.

When a user is detected close to the device 1 (arrow 51), the device inserts a log-in for the user detected (RFID code) into the request to obtain the list of bookmarks (in addition to the log-in for the device 1 (serial number)) (arrow 52). For example this may be detected by means of a RFID reader inside the device 1, which allows the RFID code of the RFID label of a user to be read. For this purpose, the device is equipped with a wireless connection (for example of the RF 868, Zigbee or Wifi type).

Upon receipt of this request, the server 3 authenticates the user detected (and possibly the device 1) then finds the account associated to the user detected which comprises a list of bookmarks configured in function of this user that is detected (block 53).

Next the server 3 returns this list to the device 1 (arrow 54). Upon receipt of this list, the device 1 displays it and allows the user to use the bookmarks that it contains (block 55).

In the case of non detection or the end of detection of a known user (arrow 56) (no RFID badge detected, or the badge detected is unknown or unauthorized for this device), the device displays (until the next periodic verification (II)) phase the last list of bookmarks memorized in the device 1 for the "standard" profile for the device itself (which is to say the profile attached to no particular user) (block 57).

FIG. 6 presents the structure of a device according to a specific embodiment of the disclosure.

The device 1 features a communication bus 61 to which are connected:
- a central processing unit 62 (for example a microprocessor CPU);
- a read only memory (ROM) 63, that may comprise one or several programs which when executed allow the device 1 to operate as described above;
- a live memory (RAM) 64, comprising registers adapted to record variables and parameters created and modified during the execution of the above-mentioned program (s);
- a communication interface 67 connected to one or several communication networks 68 (for example GPRS/Internet);
- a touch-sensitive screen 65 allowing the list of bookmarks to be viewed and used, as well as information, events and commands (in one variant, a non-touch-sensitive screen is combined with man-machine interface means such as a keyboard, a mouse or an optical stylus);
- one or several loudspeaker(s) 66, allowing sounds or music to be reproduced, if the device has the capacities to read audio contents.

The communication bus 61 permits the communication and the inter-operability between the various means featured in the device 1 or connected to this device. More generally, by means of the communication bus 61, the CPU 62 may communicate instructions to any means incorporated into the device 1.

The CPU 62 commands and controls the execution of the instructions or portions of software code of the above-mentioned program(s). When the power is switched on, the program(s) stored in the read only memory 63 is/are transferred to the live memory 64 which then contains the executable code of the program(s), as well as registers to memorize the variables and parameters required to implement these program(s).

It should be noted that the device 1 may also be a programmed appliance. This appliance would then contain the code of the computer program(s) for example integrated into an ASIC.

From a hardware point of view, the device also comprises, in one specific embodiment:
- a battery, that may be rechargeable;
- a magnet so that it may be fixed to any metallic surface;
- means of attachment allowing it to be fixed to a window;
- a stand so that it may be stood on a flat surface.

An exemplary aspect of the disclosure provides a technique for managing bookmarks allowing novice or experienced users to view and use easily a list of bookmarks.

An aspect of the disclosure provides such a technique which is cheap, compact and consumes little energy for the user.

An aspect of the disclosure provides such a technique allowing an enriched list of bookmarks to be viewed.

An aspect of the disclosure provides such a technique allowing a large number of types of bookmarks to be managed.

An aspect of the disclosure provides such a technique allowing the list of bookmarks displayed on a screen to be adapted to the user located close to this screen.

Although the present disclosure has been described with reference to one or more examples, workers skilled in the art will recognize that changes may be made in form and detail without departing from the scope of the disclosure and/or the appended claims.

What is claimed is:

1. A device for managing electronic bookmarks, wherein the device comprises:
   means for carrying out its main function of managing electronic bookmarks, activated at start-up and at determined instants, except when said device for managing bookmarks switches to a stand-by mode, wherein said means for implementing the main function comprise:
      first transmission means allowing a request to obtain a preconfigured list of bookmarks to be transmitted to a server, wherein said request comprises a log-in for said device for managing bookmarks;
      first reception means allowing said preconfigured list transmitted by said server in response to said request to be received;
      display means allowing the preconfigured list received to be displayed;
      means of use, allowing a user to use the bookmarks of the preconfigured list displayed;
      second reception means, allowing a proposal to be received, sent by the server, to add at least one additional bookmark to said preconfigured list;
      means for accepting or refusing, allowing said user to accept or refuse the proposal received; and
      second transmission means, allowing the acceptance or the refusal formulated by the user to be transmitted to the server, so that the server adds said at least one additional bookmark to said preconfigured list if accepted;
   wherein said device for managing bookmarks does not comprise:
      means which help in initial construction of said preconfigured list on said server;
      means which help to add to said preconfigured list at least one additional bookmark not previously already by said server;
   and wherein each bookmark of said preconfigured list comprises:
      a log-in for an element memorized by said bookmark;
      a link to said element memorized by said bookmark;
   and wherein the elements memorized by the bookmarks of said preconfigured list comprise at least one of connected objects or people.

2. The device according to claim 1, wherein said means for implementing the main function comprise:
   first selection means, allowing said user to select at least one bookmark to be deleted from said preconfigured list;
   third transmission means, allowing a request to delete said at least one bookmark to be deleted to be transmitted to the server, so that the server deletes said at least one bookmark to be deleted from said preconfigured list.

3. The device according to claim 1,
wherein said means of use comprise third reception means, allowing at least one event to be received, sent by the server, related to an element memorized by one of the bookmarks of said preconfigured list,
and wherein said display means allow said at least one event received to be displayed.

4. The device according to claim 1,
wherein at least one bookmark of said preconfigured list is associated to at least one information, whether dynamic or not, on the state of the element memorized by said bookmark,
and wherein said display means allow said at least one item of information to be displayed.

5. The device according to claim 1,
wherein at least one bookmark of said preconfigured list is associated to at least one command that may be executed by the element memorized by said bookmark,
and wherein said display means allow said at least one command to be displayed.

6. The device according to claim 1, wherein the device comprises wireless communication means with said server.

7. The device according to claim 1, wherein the device comprises:
   detection means, allowing a user to be detected and to obtain a log-in for the user detected;
   insertion means, activated in the case of a user being detected and allowing the log-in of the user detected to be inserted into said request to obtain the preconfigured list of bookmarks;
   such that said preconfigured list, transmitted by said server in response to said request, is in function of the log-in of the user detected.

8. A method of managing electronic bookmarks, executed by a device for managing electronic bookmarks and wherein the method comprises:
   implementing a main function for managing electronic bookmarks, carried out at a start-up of said device and at determined instants, except when said device for managing bookmarks switches to a stand-by mode, wherein implementing the main function comprises:
      transmitting to a server a request to obtain a preconfigured list of bookmarks, wherein said request comprises a log-in of said device for managing bookmarks;
      receiving said preconfigured list transmitted by said server in response to said request;
      displaying the preconfigured list received;
      allowing a user to use the bookmarks of the preconfigured list displayed,
      receiving a proposal, sent by the server, to add at least one additional bookmark to said preconfigured list;
      allowing a user to accept or refuse the proposal received; and
      transmitting to the server the acceptance or the refusal made by the user, so that the server adds said at least one additional bookmark to said preconfigured list in the case of acceptance;
   and wherein said method does not comprise:
      a step of helping in the initial construction of said preconfigured list on said server;
      a step of helping to add to said preconfigured list at least one additional bookmark not previously already by said server;
   and wherein each bookmark of said preconfigured list comprises:
      a log-in for an element memorized by said bookmark;
      a link to said element memorized by said bookmark;
   and wherein the elements memorized by the bookmarks of said preconfigured list comprise at least one of connected objects or people.

9. A non-transitory storage medium that may be read by a computer, which stores a computer program comprising a set of instructions that may be executed by a computer to implement a method of managing electronic bookmarks, executed by a device for managing electronic bookmarks, wherein the method comprises:

implementing a main function for managing electronic bookmarks, carried out at a start-up of said device and at determined instants, except when said device for managing bookmarks switches to a stand-by mode, wherein implementing the main function comprises:

transmitting to a server a request to obtain a preconfigured list of bookmarks, wherein said request comprises a log-in of said device for managing bookmarks;

receiving said preconfigured list transmitted by said server in response to said request;

displaying the preconfigured list received;

allowing a user to use the bookmarks of the preconfigured list displayed;

receiving a proposal, sent by the server, to add at least one additional bookmark to said preconfigured list;

allowing a user to accept or refuse the proposal received;

transmitting to the server the acceptance or the refusal made by the user, so that the server adds said at least one additional bookmark to said preconfigured list in the case of acceptance;

wherein said method does not comprise:

a step of helping in the initial construction of said preconfigured list on said server;

a step of helping to add to said preconfigured list at least one additional bookmark not previously already by said server;

and wherein each bookmark of said preconfigured list comprises:

a log-in for an element memorized by said bookmark;

a link to said element memorized by said bookmark;

and wherein the elements memorized by the bookmarks of said preconfigured list comprise at least one of connected objects or people.

* * * * *